April 9, 1963    A. W. FISCHER    3,084,563
TRANSMISSION
Filed June 12, 1961    2 Sheets-Sheet 2

INVENTOR.
ALBERT W. FISCHER
BY Christie, Parker & Hale
ATTORNEYS.

United States Patent Office 3,084,563
Patented Apr. 9, 1963

3,084,563
TRANSMISSION
Albert W. Fischer, Pasadena, Calif., assignor to Consolidated Electrodynamics Corporation, Pasadena, Calif., a corporation of California
Filed June 12, 1961, Ser. No. 116,523
8 Claims. (Cl. 74—375)

The invention relates to a gear transmission which includes clutch means for selecting and changing the output speed of the transmission without stopping the transmission.

The transmission of the invention is particularly adapted for driving relatively small instruments where changes in speed of the instrument are required without stopping the instrument between speed changes, such as an oscillographic recorder. Conventional transmissions for such instruments have utilized either electromagnetic clutches or spring clutches, which present the disadvantage of considerable expense in manufacture due to the relatively complex and precision elements required. The inventive apparatus is a transmission which provides a plurality of output speeds and includes positive clutch means whereby the output speed of the transmission may be selected from the several output speeds available without stopping the instrument. The inventive transmission is simple, reliable, efficient, and relatively inexpensive to manufacture.

A feature of the invention is the providing of internal gears in the transmission which are identical to each other and therefore greatly reduce the expense of manufacturing the transmission. Another feature of the invention is making the transmission gears of self-lubricating, high impact plastic material so that they may be readily made by molding, have high impact load strength, and do not require conventional means for lubricating the gears.

The inventive apparatus includes, broadly, a housing, an input shaft rotatably mounted in the housing to be rotatively driven by a drive motor, a circular main gear fixed to the input shaft for rotation therewith, an idler shaft disposed in the housing in spaced relation from the input shaft with its axis parallel to the axis of rotation of the input shaft, and an output shaft rotatably mounted in the housing in spaced relation from the idler shaft with its axis of rotation parallel to the axis of rotation of the input shaft and extending exteriorly of the housing to drive an instrument. A plurality of input gears are rotatably mounted on the input shaft and a plurality of idler gears are rotatably mounted on the idler shaft. Each input gear and idler gear is comprised of a circular drive gear and a circular pinion gear having less diameter than the drive gear and fixed to the drive gear concentrically therewith. The first idler gear meshes with the main gear and with the first input gear, the next successive idler gear meshes with the first input gear and with the next successive input gear, with the pinion gear on one meshing with the drive gear on the other, and each successive idler gear meshes with the input gear meshing with the preceding idler gear and with the next successive input gear, with the pinion gear on one meshing with the drive gear on the other, so that all of the input gears and idler gears are rotatively driven simultaneously responsive to rotation of the input shaft and main gear. A plurality of circular clutch gears are rotatably mounted on the output shaft and are axially slidable thereon with each clutch gear meshing with a different one of the idler gears and rotatively driven thereby. Clutch means is provided for each clutch gear for connecting the clutch gear to the output shaft for rotation therewith while the clutch gear remains in mesh with the idler gear responsive to axial movement of the clutch gear in one direction on the output shaft and for disengaging the clutch gear from the output shaft while the clutch gear remains in mesh with the idler gear responsive to axial movement of the clutch gear on the output shaft in the other direction. Lever means is provided for each clutch gear for selectively sliding the clutch gear axially on the output shaft, and means is provided for normally biasing each clutch gear in a position on the output shaft with its clutch means disengaged from the output shaft and with the clutch gear in mesh with the idler gear. With this arrangement, each clutch gear is in continuous mesh with its idler gear and may be selectively engaged with the output shaft for a given output speed responsive to selective actuation of the lever means for that clutch gear.

The invention will be fully understood from a reading of the following description thereof in conjunction with the accompanying drawings, in which.

Figure 1:
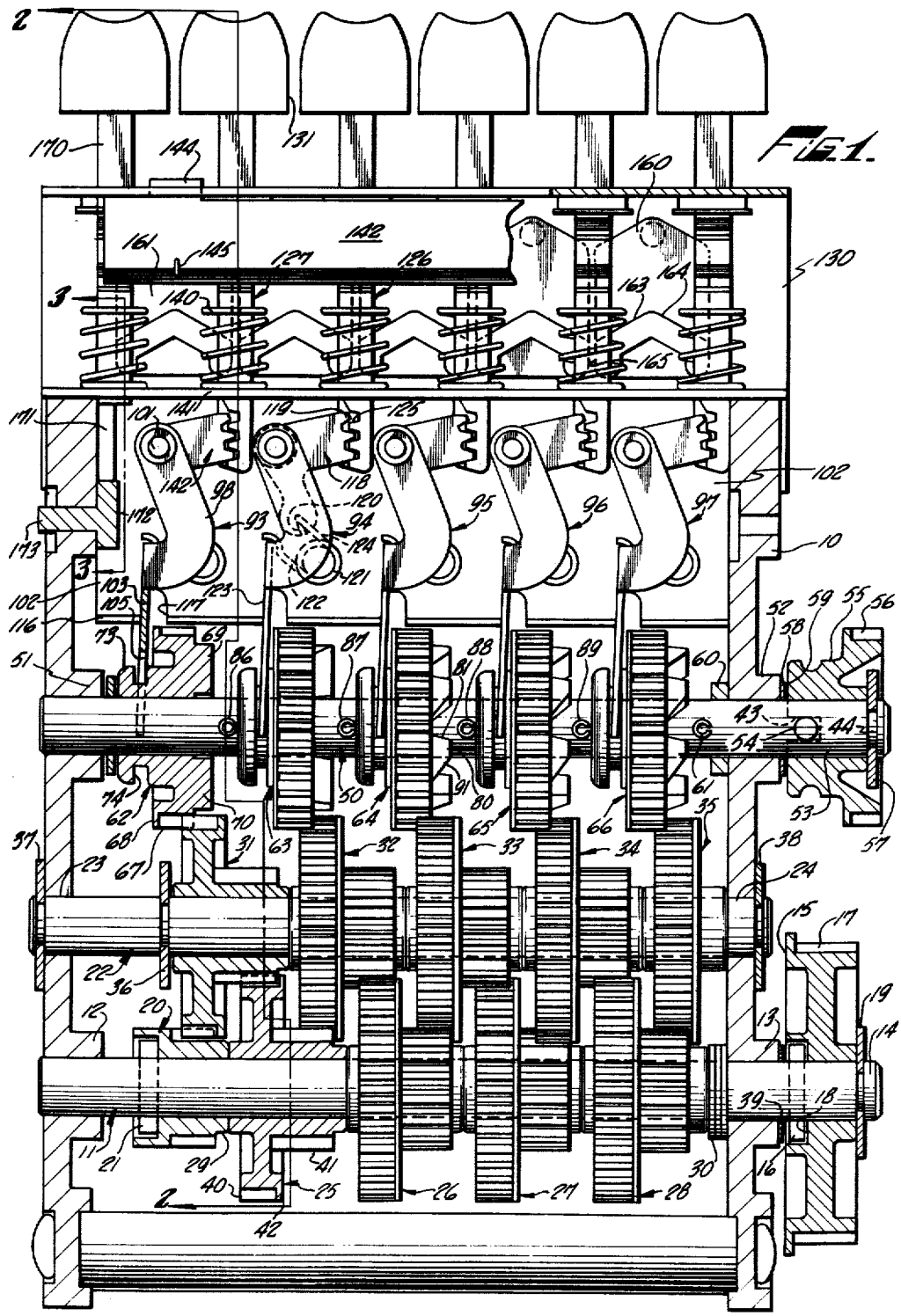
FIG. 1 is a side view, partially in section, of the invention.

Referring to FIG. 1, 10 designates a housing within which the inventive apparatus is disposed.

An elongated input shaft 11 is rotatably mounted within housing 10 by bearings 12, 13 and has a stub portion 14 extending exteriorly from the housing. A circular drive pulley 15 is connected to stub portion 14 of input shaft 11 by means of a pin 16 passing through the input shaft and seated in a recess 18 in drive pulley 15 in conventional manner so that drive pulley 15 and input shaft 11 rotate as a unit. A lock ring 19 is seated in a receiving recess in stub portion 14 of the input shaft in conventional manner and bears against drive pulley 15 to retain it on stub portion 14 of the input shaft. The exterior circumference of drive pulley 15 has radially extending teeth, such as tooth 17, which receive a similarly toothed flexible drive belt (not shown) mounted on the drive pulley of a drive motor (not shown) so that such drive motor rotatively drives input shaft 11.

A circular toothed main gear 20 is connected to input shaft 11 by means of a pin 21 passing through the input shaft and seated in a receiving recess in main gear 20 in conventional manner so that main gear 20 and input shaft 11 rotate as a unit and the main gear bears against the pin and is thus restrained from moving axially away from drive pulley 15. Main gear 20 is disposed within housing 10 and adjacent to one end of input shaft 11.

An elongated idler shaft 22 is disposed within housing 10 in spaced relation from input shaft 11 and with its axis parallel to the axis of rotation of the input shaft. One end of idler shaft 22 is supported by housing 10 at 23, and the other end of the idler shaft is supported by housing 10 at 24. Conventional lock rings 37, 38 are seated in receiving recesses in the idler shaft and engage housing 10, as shown in FIG. 1, to prevent axial movement of the idler shaft relative to housing 10.

A plurality of input gears 25, 26, 27, and 28 are rotatably mounted on input shaft 11 adjacent to each other with their hubs slidably bearing against each other. The hub of input gear 25 slidably bears against the hub 29 of main gear 20, and the hub of input gear 28 slidably bears against spacer washers 30 engaging housing 10, as shown in FIG. 1, so that the input gears are disposed axially along the input shaft in fixed axial position relative to each other and to housing 10. Input shaft 11 is restrained from axial movement relative to housing 10 by means of spacer washer 39, which allows for running clearance, and the above described connections of drive pulley 15 and main gear 20 to input shaft 11 and the sliding bearing engagement of the hubs of the input gears. Each of the input gears is rotatably mounted on input shaft 11 and is free to rotate relative to the input shaft and relative to the other input gears independently of rotation of the input shaft and independently of rotation of the other input gears.

A plurality of idler gears 31, 32, 33, 34, and 35 are rotatably mounted on idler shaft 22 for free and independent rotation of each idler gear relative to the idler shaft and relative to the other idler gears. The hubs of each idler gear abut in sliding bearing engagement, as illustrated in FIG. 1, and the hub of idler gear 31 is maintained in selected axial position on the idler shaft by means of stop ring 36 fixed to the idler shaft and the slidable engagement of the hub of idler gear 35 with the interior surface of housing 10, as illustrated, so that the several idler gears are disposed axially along idler shaft 32 in fixed axial position relative to each other and to housing 10.

All of input gears 25, 26, 27, and 28 and idler gears 31, 32, 33, and 34 are identical so that only one will be described in detail. Referring to input gear 25, such input gear comprises a circular toothed drive gear 40 and a circular toothed pinion gear 41 of considerably less diameter than drive gear 40 and fixed to drive gear 40 concentrically therewith. As illustrated, the input gear is an integral cluster gear. A flange 42 extends radially outwardly about the outer circumference of drive gear 40 and between the ends of the teeth thereon. Flange 42 is disposed on the side of drive gear 40 nearest pinion gear 41. Idler gear 35 is the same as the other input and idler gears, except that it has a blank hub in place of a pinion gear, although if desired idler gear 35 may have a pinion gear the same as the other input and idler gears so that it is identical to the other input and idler gears.

Idler gear 31 is disposed with its drive gear in mesh with main gear 20 and with its pinion gear in mesh with the drive gear of input gear 25. The next successive idler gear 32 is disposed with its drive gear in mesh with pinion gear 41 of input gear 25 and with its pinion gear in mesh with the drive gear of the next succeeding input gear 26. Each successive idler gear 33, 34 is similarly disposed with its drive gear in mesh with the pinion gear of the input gear having its drive gear in mesh with the pinion gear of the preceding idler gear and with its pinion gear in mesh with the drive gear of the next successive input gear. Idler gear 35 has no meshing pinion gear, since its drive gear meshes with the pinion gear of the last input gear. As a consequence, all of the input gears and idler gears are rotatably driven simultaneously responsive to rotation of input shaft 11 and main gear 20. Since in each case the drive is from pinion gear to drive gear, it is apparent that each idler gear from left to right in FIG. 1 is rotatably driven at a lower speed than the preceding idler gear so that idler gear 31 has the highest speed of rotation and idler gear 35 has the lowest speed of rotation. The circumferential flanges on each drive gear, such as the flange 42 on drive gear 25, are spaced slightly from the end of the pinion gear with which such drive gear meshes.

An important feature of the input and idler gears is the fact that they are all the same (except idler gear 35) which greatly reduces the cost of manufacturing same. The input and idler gears are made of a self-lubricating, high impact plastic having a Fiberglas fill, for example, Fiberglas filled nylon containing 4% molydisulphide, which has high tensile and impact strength, good self-lubricating properties, and good dimensional stability against variation in temperature and humidity. The use of the type of plastic described above for the gears is an important feature because of the economy in molding the gears of such material, the physical properties of such material as described above, and the elimination of need for liquid lubricants because of the self-lubricating properties of such material.

An elongated output shaft 50 is rotatably mounted within housing 10 at each end by means of conventional bearings 51, 52 in spaced relation from idler shaft 22 and with its axis of rotation parallel to the axis of rotation of input shaft 11. Output shaft 50 includes a stub portion 53 which extends exteriorly from housing 10. An output drive pulley 55 is mounted in conventional manner on stub portion 53 for rotation with output shaft 50 by means of a pin 54 extending through stub portion 53 and engaging in a receiving notch 43 in output drive pulley 55 and retaining ring 57 seated in a receiving recess 44 in stub portion 53 and engaging the output drive pulley, in the same manner as for drive pulley 15. Output drive pulley 55 has a circular toothed periphery 56 which engages a flexible toothed belt or a suitable gear wheel to drive the instrument with which the transmission is utilized. Output shaft 50 is restrained from axial movement, except for working clearance, by means of shim washer 58 disposed about the output shaft between the exterior face of bearing 52 and the end 59 of the hub of output drive pulley 55 and sliding bearing engagement between thrust washer 60 and stop pin 61 extending through output shaft 50.

A plurality of circular clutch gears 62, 63, 64, 65, and 66 are rotatably mounted on output shaft 50 for free rotation thereon relative to the output shaft and for axial sliding movement on the output shaft. Clutch gear 62 has radial gear teeth about its circumference 67 and, as illustrated, clutch gear 62 is disposed in mesh with the drive gear of idler gear 31. A flange 68 extends radially outwardly and between the ends of the gear teeth on clutch gear 62 on the side thereof remote from the drive gear of idler gear 31 in the same manner as the above described flange 42 on input gear 25.

Figure 2:
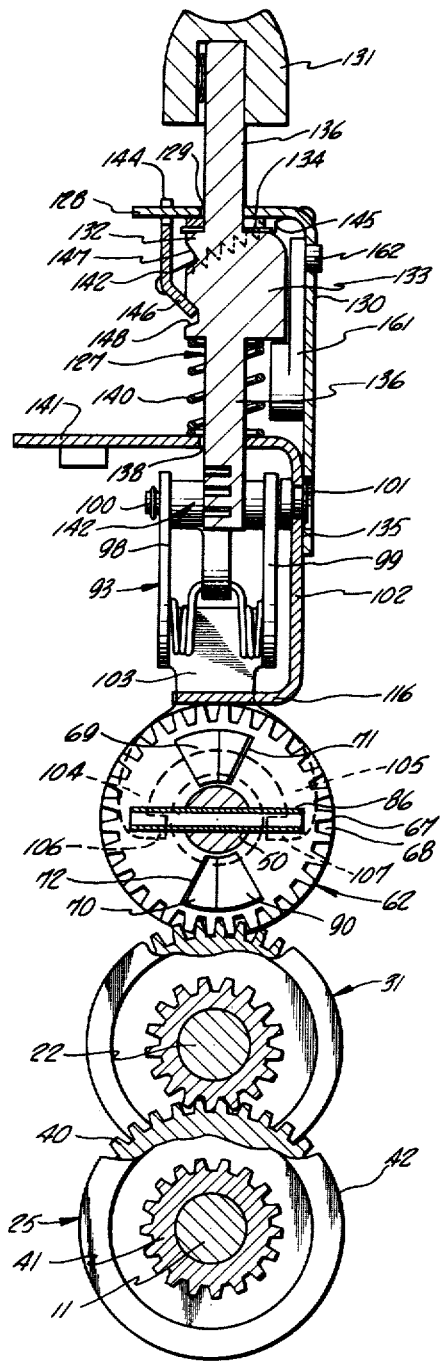
FIG. 2 is a sectional view along the line 2—2 in FIG. 1.

A plurality of dogs extend axially outwardly from one side of clutch gear 62 and are spaced from each other about output shaft 50, such dogs being indicated at 69 and 70. As best shown in FIG. 2, dog 69 has a generally planar engaging face 71 extending radially outwardly from the axis of the output shaft. Engaging face 71 is oriented at approximately right angles to the plane of rotation of clutch gear 62 and has a slight backslant from the direction of rotation of such clutch gear. Dog 70 has an engaging face 72 the same as engaging face 71, and dogs 69 and 70 are otherwise identical in form. Clutch gear 62 has a hub 73 extending axially outwardly therefrom on the side of the clutch gear opposite the side from which dogs 69, 70 extend. Hub 73 defines an annular channel 74 concentric with the axis of rotation of clutch gear 62, the purpose of which is explained below. Clutch gear 63 is identical in construction to clutch gear 62, and clutch gears 64, 65, and 66 are all identical to each other and identical to clutch gear 62 with the exception that the plurality of dogs is increased from two to eight because these clutch gears rotate at slower speeds than clutch gears 62 and 63. Referring to clutch gear 64, the dogs thereon, such as dog 80, are generally similar to the dogs described above on clutch gear 62 except that the circumferential extent of each dog is not as great as dogs 69 and 70 and the dogs are spaced closer together in order to accommodate the greater number of dogs. Each dog on clutch gear 64 has a generally planar engaging face, such as at 81, extending from the clutch gear and oriented as described above for engaging face 71, with all of the dogs identical to each other. Clutch gears 63, 64, 65, and 66 are disposed in mesh with the drive gears of idler gears 32, 33, 34, and 35, respectively, in the same manner as described above for the mesh of clutch gear 62 with the drive gear of idler gear 31. All of the clutch gears are made of the material described above from which the input and idler gears are made for the same purpose and to effect the same advantages as described above in connection with the input and idler gears.

A pin is fixed to the ouput shaft and extends radially therefrom adjacent each clutch gear on the same side thereof as the dogs on that clutch gear and spaced axially from such dogs, as indicated at 86, 87, 88, 89, and 61. The pins are all the same and may be roll pins disposed in holes extending through output shaft 50. The dogs on each clutch gear are spaced from each other symmetrically about the axis of rotation of the clutch gear and sufficiently to receive the pin between any two dogs so that the engaging faces on the dogs engage the pin. Each pin is so aligned with the idler gear with which the clutch gear having its dogs adjacent to the pin meshes so that the clutch gear remains in mesh with its idler gear when it is moved axially to the right in FIG. 1 to dispose the pin between the dogs on the clutch gear and thereby connect the clutch gear to output shaft 50 for rotation therewith. Thus, when clutch gear 62 is moved to the right in FIG. 1 so that pin 86 is disposed between dogs 69 and 70, it merely moves further into mesh with the drive gear of idler gear 31. The pins also serve as stops to prevent the clutch gears from moving to the left in FIG. 1 out of mesh with the drive gear of the idler gear with which they mesh, this being effected by engagement between the pin and the hub on the clutch gear, as illustrated in FIG. 1. It is thus apparent that each clutch gear remains in continuous mesh with the drive gear of one of the idler gears and is axially slidable on output shaft 50 so that when it is moved to the right in FIG. 1, the engaging faces on its dogs engage the pin adjacent thereto and thereby connect the clutch gear to output shaft 50 to rotatively drive the output shaft, and when it is moved as far as possible to the left in FIG. 1, it remains in mesh with its idler gear with its dogs spaced axially from the pin adjacent thereto for free rotation independently of the output shaft. The trailing edge of each dog, such as the trailing edge 90 of dog 70 on clutch gear 62 and the trailing edge 91 of dog 80 on clutch gear 64, extend from the outermost extent of the dog to the innermost extent of the dog in tapered or inclined orientation toward the engaging face of the next following dog so that a pin striking same will be guided into the space between the dogs and engage the engaging face on the next following dog. Also, if by accident two or more clutch gears become engaged with their pins, all except the clutch gear with the greatest speed will automatically disengage from their pins because such pins will have a higher rotational speed than their clutch gears and consequently the pins will ride up on the inclined trailing edges of the dogs on the clutch gears and through a wedging action displace the clutch gears axially away from the pins and disengage the dogs on the clutch gears from the pins. In order that the pins and the dogs on the clutch gears cooperate properly as described above, all the clutch gears are rotatively driven in a clockwise direction as viewed in FIG. 2 by means rotatively driving input shaft 11 in a clockwise direction as viewed in FIG. 2 with the drive motor.

A plurality of levers 93, 94, 95, 96, and 97, each identical, are disposed each with one of its ends disposed movably in the annular recess in the hub of a different clutch gear, such as the recess 74 in hub 73 of clutch gear 62, so that the clutch gear rotates freely relative to the lever and the lever may be actuated in the axial direction of output shaft 50 to move the clutch gear to which it is connected axially on the output shaft. Since all of the levers are identical, only lever 93 will be described in detail. Referring to FIG. 2, lever 93 has a pair of spaced legs 98, 99 which are rotatably received on a stub shaft 100 fixed at 101 to a support 102 which, in turn, is fixed to housing 10. Lever 93 is thus pivotally mounted for pivotal movement about stub shaft 100 in a plane at right angles to the plane of rotation of clutch gear 62. Each of the other levers is mounted in exactly the same manner for the same pivotal movement. Legs 98, 99 are joined together by a web 103 which extends downwardly and defines an arcuate forked end having legs 104, 105. Legs 104, 105 have tab portions 106, 107, respectively, which extend radially inwardly toward the axis of rotation of clutch gear 62 and are movably disposed in recess 74 in hub 73 of such clutch gear to engage the clutch gear for the movement thereof described above. Support 102 has a flange 116 which extends over output shaft 50 in spaced relation therefrom and defines a plurality of gaps, each identical, such as gap 117, in which the web of each lever, such as the web 103 of lever 93, is disposed. Flange 116 thus serves as a stop for the levers and limits the motion thereof in both directions about their respective stub shafts. The gaps, such a gap 117, are all the same size measured in the axial direction of output shaft 50 and are designed so that when the levers are in their unactuated positions, as shown in FIG. 1, their limit of travel to the left in FIG. 1 is such that the clutch gear connected thereto cannot move to the left out of mesh with its idler gear, and when any one of the levers is moved to the right in FIG. 1 to its actuated position it displaces the clutch gear connected thereto to the right in FIG. 1 sufficiently so that the dogs on that clutch gear receive and engage the pin on output shaft 50 adjacent to such dogs.

A toggle, such as toggle 118 in FIG. 1, is pivotally disposed on each lever stub shaft, such as stub shaft 100, for pivotal movement about such stub shaft independently of movement of the lever thereabout. All the toggles are identical so that any description of one applies to all. Toggle 118 is in the form of a bell crank. One end of the crank is a gear segment 119 and in the other end of the crank is a slot 120. As best shown for toggle 142 in FIG. 2, the toggle is disposed between legs 98, 99 of lever 93, and its cranks lie in the plane of the axis of output shaft 50. As stated above, toggle 118, although pivotally mounted on the same stub shaft as lever 94, is free to pivot in the same plane as lever 94 but independently thereof. Identical torsion springs, such as torsion spring 121, are disposed between each toggle and the lever associated therewith. As best shown for toggle 118 and lever 94, torsion spring 121 has one arm 122 hooked over the top of web 123 of lever 94 and the other arm 124 disposed in the notch 120 in the crank of toggle 118.

Gear segment 119 on toggle 118 meshes with a rack 125 on a pushrod 126. There is a pushrod for each toggle, and each pushrod is the same so that what is described with respect to one applies to all the others. As shown in FIG. 2, the shank 136 of pushrod 127 is slidably received in guiding hole 138 in flange 141 of support 102 and hole 129 in flange 128 of support 130 for sliding movement in the plane of the axis of output shaft 50 and extends exteriorly of support 130. Support 130 is rigidly connected to support 102 at 135, as by spot welding or the like. On its end exterior of support 130, the shank of pushrod 127 receives a push button 131 so that an operator can push the button 131 to axially displace pushrod 127. Lugs 132, 133 extend transversely from shank 136 of pushrod 127 and engage against a stop washer 134 seated on the inside of flange 128 of support 130. A compression spring 140 is disposed in compressed condition between flange 141 on support 102 and the bottom surfaces of lugs 132, 133. Spring 140 yieldingly biases pushrod 127 in its uppermost position, as illustrated, which is the unactuated position of pushrod 127, toggle 142 and lever 93.

A latch bar 142 is movably mounted in flange 128 of support 120 by means of a tab portion at each end extending movably through a receiving hole in flange 128, such as tab portion 144 (FIG. 1) at the left end of the latch bar, so that the latch bar is free to move back and forth in a direction transverse to the direction of axial movement of the pushrods and in the direction of the transverse extent of the lugs from the shanks of the pushrods, such as lugs 132, 133 on pushrod 127. A tension spring at each end of latch bar 142 extends between the latch bar and support 130, such as spring 145, and yieldingly biases the latch bar inwardly toward the pushrods. Latch bar 142 has a finger portion 146 angled inwardly toward the pushrods which engages in axially spaced notches 147 and 148 in lug 132. It is to be understood that each pushrod is identical to pushrod 127 and therefore has the same lugs and notches on it, such as lug 132 and notches 147 and 148 on pushrod 127. Each notch 147, 148 has upper and lower inclined faces, as illustrated clearly in FIG. 2, to facilitate seating of finger portion 146 of latch bar 142 in such notches and disengagement of the latch bar therefrom. The spacing between the notches is equal to the movement of the pushrod between its unactuated and actuated positions, so that with pushrod 127 in its normal unactuated position, as illustrated, finger portion 146 of latch bar 142 resides in the bottommost notch 148 defined in lug 132. When pushrod 127 is moved downwardly to its actuated position, latch bar 142 rides out of notch 148 and seats in notch 147 which is so oriented and positioned on lug 132 so that finger portion 146 of the latch bar will register therein when the pushrod is in its fully actuated position. Biasing spring 145 insures that finger portion 146 of the latch bar rides on lug 132 and seats in whichever notch is aligned therewith. When finger portion 146 of the latch bar seats in notch 147, it acts to hold pushrod 127 in down or fully actuated position. Upon depression of another pushrod toward its actuated down position, it is apparent that the latch bar will be moved outwardly in disengaging from the bottommost notch in the lug on that pushrod and in so doing will disengage from notch 147 on pushrod 127 and consequently permit compressed spring 140 to return pushrod 127 to its up and unactuated position. It is thus apparent that upon actuation of one pushrod to its actuated down position, it is held in such position by means of the latch bar until another pushrod is moved downwardly toward its down actuated position, whereupon the pushrod which was previously moved to actuated position and held there by the latch bar is released from the latch bar and returns to unactuated position and the second pushrod moved to actuated position is in turn held in actuated position by the latch bar until another pushrod is moved downwardly toward its actuated position. It is to be noted that there is a dwell surface between the two notches 147, 148 on lug 132 so that a pushrod being held in actuated position is released and returned to unactuated position before a pushrod being moved downwardly reaches its fully actuated position in which finger portion 146 of the latch bar registers in its uppermost notch.

Referring to pushrod 126, movement thereof downwardly to its fully actuated position causes toggle 118 to be rotated in a clockwise direction in FIG. 1 through engagement of rack 125 on the shank of the pushrod with gear segment 119 on the toggle. This rotation of toggle 118 in a clockwise direction moves its end defining recess 120 to the left of web 123 of lever 94, as shown in FIG. 1, and thereby causes torsion spring 121 to bias lever 94 to the right in FIG. 1 away from the toggle. This results in lever 94 moving to the right in FIG. 1 to its fully actuated position, whereby clutch gear 63 is moved to the right in FIG. 1 further into mesh with the drive gear of idler gear 32 and with pin 87 disposed between the dogs on the clutch gear to engage the dogs and connect the clutch gear to output shaft 50 to rotatively drive the output shaft. This movement of toggle 118 relative to lever 94 is designed so that when pushrod 126, toggle 118 and lever 94 are in their fully actuated positions, torsion spring 121 is compressed and urges lever 94 in its actuated position as described above. Upon return of pushrod 126 to its unactuated position, as shown in FIG. 1, toggle 118 is rotated in a counter-clockwise direction in FIG. 1 to the position shown in FIG. 1, thereby disposing its end having recess 120 to the right of lever 94 in FIG. 1 so that torsion spring 121 urges apart the toggle and lever 94 and thereby displaces lever 94 and clutch gear 63 to the left in FIG. 1 so that the dogs on the clutch gear are spaced from pin 87 but with the clutch gear still in mesh with the drive gear of idler gear 32 and rotatively driven thereby independently of rotation of output shaft 50. Torsion spring 121 is stressed so that it biases lever 94 in its unactuated position shown in FIG. 1 and described above wherein clutch gear 63 is in mesh with the drive gear of idler gear 32 with the dogs on the clutch gear disengaged from pin 87 so that clutch gear 63 rotates freely and independently of output shaft 50. Torsion spring 121 is designed so that it biases lever 94 in its above described unactuated position when pushrod 126 has been returned to its unactuated position as described above. It is thus apparent that toggle 118 and torsion spring 121 function as a snap toggle to move lever 94 to either its actuated position or to its unactuated position and to bias lever 94 is whichever position to which it has been moved responsive to movement of pushrod 126 to actuated position and to unactuated position, respectively, as described above.

Interlock means is provided so that a pushrod and its associated toggle and lever cannot be moved to fully actuated position until all the other levers and pushrods are in unactuated position. The interlock means takes the form of a plurality of plates, each identical, such as plate 160 in FIG. 1. As illustrated in FIG. 1, one plate is disposed between each pair of pushrods. Each plate is pivotally mounted on support 130 for pivotal movement about an axis transverse to the direction of movement of the pushrods. As illustrated in FIG. 2 for plate 161, this pivotal mounting takes the form of a stub shaft 162 rotatably mounted in a receiving aperture in support 130. Each plate has a pair of downwardly extending cam surfaces, such as 163 and 164 on plate 160 in FIG. 1, which are aligned with the lugs on the same side of the pushrods as the plates, such as lug 133 on pushrod 127 as shown in FIG. 2, so that the lug engages the cam surfaces on each side of the lug as the pushrod is moved downwardly to fully actuated position. The several plates are spaced from each other so that only one lug, such as lug 133 on pushrod 127, can be disposed between the actuating portion of the cam surfaces on each side thereof at a time, such actuating portion being indicated at 165 for cam surface 163 on plate 160. The actuating portions of the several cam surfaces on the plates are located so that the lug on the pushrod is not disposed therebetween until the pushrod is in fully actuated position. Accordingly, upon movement of a pushrod downwardly to fully actuated position, its lug, such as lug 133 for pushrod 127, is disposed between the actuating portions of the cam surfaces on the plates on each side of the pushrod and thereby causes such plates to rotate away from the pushrod and to engage the other plates so that the actuating portions of the cam surfaces on the other plates engage each other. Consequently, the other plates are not free to move, so that the corresponding lug on another pushrod cannot be disposed between the actuating portions of the cam surfaces thereon. Upon movement of the pushrod previously moved to fully actuated position upwardly toward its unactuated position, its lug, such as lug 133 for pushrod 127, is removed from the actuating portions of the cam surfaces on the plates on each side thereof, and consequently the corresponding lug on another pushrod may be disposed between the actuating portions of the cam surfaces on the cam plates on each side thereof as it is moved to fully actuated position. The plates, such as plate 160, are preferably made of the same material as described above the input and idler gears.

Figure 3:
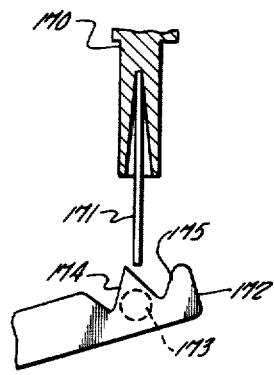
FIG. 3 is a sectional view along the line 3—3 in FIG. 1.

An extra pushrod 170 is provided to turn on and off the drive motor which rotatively drives drive pulley 15, and also to clear all of the other pushrods and levers to their fully unactuated positions responsive to turning the drive motor on and off. Pushrod 170 is the same as all the other pushrods except instead of having a rack at the end of its shank, it has a resiliently flexible spring leaf 171 fixed to its end which extends downwardly from it and is disposed over a lever 172 pivotally mounted by means of stub shaft 173 on housing 10. The left end of lever 172 as shown in FIG. 3 is connected in conventional manner through suitable linkage to a conventional on-off switch for the drive motor which is actuated to "on" position responsive to rotational movement of lever 172 in one direction and to "off" position responsive to rotational movement of lever 172 in the other direction. A pair of notches 174, 175 are formed in lever 172 symmetrically on each side of its stub shaft 173 to engage leaf 171. Notches 174, 175 have adjacent inclined surfaces which converge as they extend upwardly toward leaf 171 so that downward movement of leaf 171 causes it to engage one of such surfaces and be guided into the notch thereof and thereby cause lever 172 to be rotated about its stub shaft 173 to actuate the switch. As illustrated, the switch is in "off" position, and downward movement of leaf 171 engages in notch 175 to rotate lever 172 clockwise. This turns on the switch and disposes notch 174 under the leaf, so that the next downward movement of leaf 171 engages in notch 174 to rotate lever 172 counterclockwise to the positon shown in FIG. 3 and thus move the switch to "off" posiiton. Resilient flexure of leaf 171 laterally accommodates the location and displacement of the notches laterally of the axis of movement of pushrod 170. Since pushrod 170 has the same lug and notch arrangement as lug 132 and notches 147, 148 described above for pushrod 127, it functions in the same manner as described above to lift latch bar 142 and thereby permit any other pushrods which are being held in fully actuated position by means of finger portion 146 on the latch bar to return to their unactuated position. It is apparent that pushrod 170 will be held in down position until another of the pushrods is moved downwardly to engage a clutch gear and release the latch bar to thereby permit pushrod 170 to return to its unactuated position as shown in FIGS. 1 and 3. This disengages leaf 171 from the notch in which it had previously registered, but lever 172 does not rotate as a result of such disengagement because of its linkage to the switch. Consequently, such disengagement has no effect on the switch, since the switch is actuated only in response to rotational movement of lever 172 about stub shaft 173 responsive to downward movement of leaf 171. When the drive motor is to be turned off, pushrod 170 is again moved downwardly to its fully actuated position to rotate lever 172 and thus actuate the switch to its "off" position and also to clear the other pushrods and levers to their fully unactuated positions as described above. It is thus apparent that pushrod 170 is normally in unactuated position and is moved downwardly to actuated position, both to turn on and to turn off the drive motor, and in each case clears the other pushrods to their fully unactuated positions as described above responsive to downward movement to its actuated position.

Referring to FIG. 2, input shaft 11, idler shaft 22 and output shaft 50, as well as the lever and pushrod mechanism, are shown vertically aligned, but it is to be understood that other relative alignments may be utilized for a more compact transmission so long as such elements bear the same functional relationships to each other as described above for FIG. 2.

I claim:

1. A transmission comprising a housing, an input shaft disposed on the housing, means for rotatably mounting the input shaft on the housing, means on the input shaft for connecting the input shaft to a rotary drive mechanism exterior to the transmission, a circular main gear on the input shaft fixed to the input shaft for rotation therewith, an idler shaft disposed on the housing in spaced relation from the input shaft with its axis parallel to the axis of rotation of the input shaft, a plurality of input gears disposed on the input shaft, each of the input gears being independently rotatable relative to the other input gears and relative to the input shaft, a plurality of idler gears disposed on the idler shaft, each of the idler gears on the idler shaft being independently rotatable relative to the other idler gears and relative to the idler shaft, each input gear and idler gear being comprised of a circular drive gear and a circular pinion gear having less diameter than the drive gear and fixed to the drive gear concentrically therewith, a first idler gear disposed in mesh with the main gear and in mesh with a first input gear, the next successive idler gear being disposed in mesh with the first input gear and in mesh with the next successive input gear with the pinion gear on one in mesh with the drive gear on the other, and each successive idler gear being disposed in mesh with the input gear meshing with the preceding idler gear and in mesh with the next successive input gear with the pinion gear on one in mesh with the drive gear on the other, so that all of the input gears and idler gears are rotatively driven simultaneously responsive to rotation of the input shaft and main gear, an output shaft disposed on the housing in spaced relation from the idler shaft, means for rotatably mounting the output shaft on the housing with its axis of rotation parallel to the axis of rotation of the input shaft, a plurality of circular clutch gears disposed on the output shaft, each clutch gear on the output shaft being independently rotatable relative to the output shaft and relative to the other clutch gears and being slidably movable of the output shaft in the direction of the axis of the output shaft, each clutch gear being disposed in mesh with a different one of the idler gears and rotatively driven thereby, clutch means for each clutch gear for connecting the clutch gear to the output shaft for rotation therewith while the clutch gear remains in mesh with the idler gear responsive to axial movement of the clutch gear in one direction on the output shaft and for disengaging the clutch gear from the output shaft while the clutch gear remains in mesh with the idler gear responsive to axial movement of the clutch gear in the other direction on the output shaft, and lever means for each clutch gear for selectively sliding the clutch gear axially on the output shaft while the output gear remains in mesh with the idler gear.

2. A transmission comprising a housing, an input shaft disposed on the housing, means for rotatably mounting the input shaft on the housing, a circular main gear on the input shaft fixed to the input shaft for rotation therewith, an idler shaft disposed on the housing in spaced relation from the input shaft with its axis parallel to the axis of rotation of the input shaft, a plurality of input gears disposed on the input shaft, each of the input gears on the input shaft being independently rotatable relative to the other input gears and relative to the input shaft, a plurality of idler gears disposed on the idler shaft, each of the idler gears on the idler shaft being independently rotatable relative to the other idler gears and relative to the idler shaft, each input gear and idler gear being comprised of a circular drive gear and a circular pinion gear having less diameter than the drive gear and fixed to the drive gear concentrically therewith, a first idler gear disposed in mesh with the main gear and in mesh with a first input gear, the next successive idler gear being disposed in mesh with the first input gear and in mesh with the next successive input gear with the pinion gear on one in mesh with the drive gear on the other, and each successive idler gear being disposed in mesh with the input gear meshing with the preceding idler gear and in mesh with the next successive input gear with the pinion gear on one in mesh with the drive gear on the other, so that all of the input gears and idler gears are rotatively driven simultaneously responsive to rotation of the input shaft and main gear, an output shaft disposed on the housing in spaced relation from the idler shaft, means for rotatably mounting the output shaft on the housing with its axis of rotation parallel to the axis of rotation of the input shaft, a plurality of circular clutch gears disposed on the output shaft, each clutch gear on the output shaft being independently rotatable relative to the output shaft and relative to the other clutch gears and being slidably movable of the output shaft in the direction of the axis of the output shaft, each clutch gear being disposed in mesh with a different one of the idler gears and rotatively driven thereby, clutch means for each clutch gear for connecting the clutch gear to the output shaft for rotation therewith while the clutch gear remains in mesh with the idler gear responsive to axial movement of the clutch gear in one direction on the output shaft and for disengaging the clutch gear from the output shaft while the clutch gear remains in mesh with the idler gear responsive to axial movement of the clutch gear in the other direction on the output shaft, lever means for each clutch gear for selectively sliding the clutch gear axially on the output shaft responsive to actuation of the lever means while the clutch gear remains in mesh with the idler gear, and means for normally biasing each clutch gear in a position on the output shaft with its clutch means disengaged and with the clutch gear in mesh with the idler gear and for releasably holding the clutch gear in a position on the output shaft with its clutch means engaged and with the clutch gear in mesh with the idler gear responsive to actuation of the lever means for that clutch gear.

3. Apparatus in accordance with claim 2 wherein each input gear, idler gear, and clutch gear is made of a composition of self-lubricating high impact plastic material containing fiberglass and the input gears and idler gears are identical.

4. Apparatus in accordance with claim 2 wherein each clutch means comprises a plurality of dogs extending axially outwardly from one side of the clutch gear and spaced from each other about the output shaft, and a pin fixed to the output shaft and extending radially therefrom adjacent each clutch gear on the same side thereof as the dogs on the clutch gear and spaced axially on the output shaft from such dogs, said dogs being spaced from each other about the output shaft to receive and engage the pin between the dogs.

5. A transmission comprising a housing, an input shaft disposed on the housing, means for rotatably mounting the input shaft on the housing, a circular main gear on the input shaft, means for fixing the main gear to the input shaft for rotation therewith, an idler shaft disposed on the housing in spaced relation from the input shaft with its axis parallel to the axis of rotation of the input shaft, a plurality of input gears disposed on the input shaft, means for mounting the input gears on the input shaft for independent rotation of each input gear relative to the other input gears and relative to the input shaft, a plurality of idler gears disposed on the idler shaft, means for mounting the idler gears on the idler shaft for independent rotation of each idler gear relative to the other idler gears and relative to the idler shaft, each input gear and idler gear being comprised of a circular drive gear and a circular pinion gear having less diameter than the drive gear and fixed to the drive gear concentrically therewith, a first idler gear disposed in mesh with the main gear and in mesh with a first input gear, the next successive idler gear being disposed in mesh with the first input gear and in mesh with the next successive input gear with the pinion gear on one in mesh with the drive gear on the other, and each successive idler gear being disposed in mesh with the input gear meshing with the preceding idler gear and in mesh with the next successive input gear with the pinion gear on one in mesh with the drive gear on the other, so that all of the input gears and idler gears are rotatively driven simultaneously responsive to rotation of the input shaft and main gear, an output shaft disposed on the housing in spaced relation from the idler shaft, means for rotatably mounting the output shaft on the housing with its axis of rotation parallel to the axis of rotation of the input shaft, a plurality of circular clutch gears disposed on the output shaft, means for mounting each clutch gear on the output shaft for independent rotation of each clutch gear relative to the output shaft and relative to the other clutch gears and for sliding movement of each clutch gear on the output shaft in the direction of the axis of the output shaft, each clutch gear being disposed in mesh with a different one of the idler gears and rotatively driven thereby, stop means adjacent each clutch gear on one side thereof and fixed to the output shaft to rotate therewith for engaging the clutch gear, clutch means on the side of each clutch gear adjacent the stop means for engaging the stop means responsive to axial movement of the clutch gear on the output shaft toward the stop means while the clutch gear remains in mesh with the idler gear and for disengaging from such stop means responsive to axial movement of the clutch gear on the output shaft away from the stop means, lever means connected to each clutch gear for sliding the clutch gear axially on the output shaft responsive to movement of the lever means while the clutch gear rotates freely relative to the lever means and remains in mesh with the idler gear, means for moving each lever means to actuated position wherein it displaces the clutch gear connected thereto toward the stop means adjacent the clutch gear to engage the clutch means on the clutch gear with such stop means, means for biasing each lever means in its unactuated position, means for releasably holding each lever means in its actuated position responsive to movement of the lever means to actuated position and for releasing the lever means to its unactuated position responsive to movement of another lever means toward actuated position, interlock means for preventing movement of a lever means to actuated position while another lever means in actuated position, and means for biasing each clutch gear in a position on the output shaft with the clutch means on the clutch gear axially spaced from the stop means adjacent thereto and with the clutch gear in mesh with the idler gear responsive to unactuated position of the lever means connected to the clutch gear and for biasing each clutch gear in a position on the output shaft with its clutch means in engagement with the stop means adjacent thereto and with the clutch gear in mesh with the idler gear responsive to actuated position of such lever means.

6. Apparatus in accordance with claim 5 wherein each lever means includes a pushrod having a shank and a lug on the shank extending transversely from the shank, the shanks of the several pushrods being aligned, the interlock means includes a plurality of plates disposed one between each pair of shanks, means for pivotally mounting each plate on the housing about a pivot axis transverse to the direction of axial movement of the shanks, each plate defining cam surfaces aligned with the lugs on the shanks, means for spacing the cam surfaces and the lugs so that axial movement of a pushrod displaces the lug thereon into engagement with the cam surfaces of the plate on each side of the pushrod and rotates each plate away from the lug to dispose the lug between the cam surfaces holding the plates on each side thereof in displaced position and so that the several cam surfaces are spaced from each other to accommodate only one lug between the cam surfaces of any two plates at a time, and means for moving the lever means to actuated position responsive to movement of the pushrod to a position with the lug on its shank disposed between the cam surfaces of the plates on each side thereof and holding the plates in fully displaced position, so that movement of a pushrod to move the lever means to actuated position disposes the lug on the shank of that pushrod between the cam surfaces of the plates on each side of that shank and displaces the plates to block actuation of another pushrod while the lug is so disposed.

7. A transmission comprising a housing, an elongated input shaft disposed in the housing and extending exteriorly from the housing, means for rotatably mounting the input shaft on the housing, a circular main gear on the input shaft within the housing, means for fixing the main gear to the input shaft for rotation of the main gear with the input shaft, an elongated idler shaft disposed in the housing in spaced relation from the input shaft with its axis parallel to the axis of rotation of the input shaft, a plurality of input gears disposed on the input shaft adjacent to each other, means for rotatably mounting each input gear on the input shaft for independent rotation of the input gear relative to the input shaft and relative to the other input gears, a plurality of idler gears disposed on the idler shaft adjacent to each other and aligned with the input gears, means for rotatably mounting each idler gear on the idler shaft for independent rotation of the idler gear relative to the idler shaft and relative to the other idler gears, each input gear and idler gear being identical and being comprised of a circular drive gear and a circular pinion gear having less diameter than the drive gear and fixed to the drive gear concentrically therewith, a first idler gear disposed with its drive gear in mesh with the main gear and with its pinion gear in mesh with the drive gear of a first input gear, the next successive idler gear disposed with its drive gear in mesh with the pinion gear of the first input gear and with its pinion gear in mesh with the drive gear of the next successive input gear, and each successive idler gear being disposed with its drive gear in mesh with the pinion gear of the input gear in mesh with the pinion gear of the preceding idler gear and with its pinion gear in mesh with the drive gear of the next successive input gear, so that all of the input gears and idler gears are rotatively driven simultaneously responsive to rotation of the input shaft and main gear, an elongated output shaft disposed in the housing in spaced relation from the idler shaft, means for rotatably mounting the output shaft on the housing with its axis of rotation parallel to the axis of rotation of the input shaft, a plurality of circular clutch gears on the output shaft in axially spaced relation from each other, means for rotatably mounting each clutch gear on the output shaft for independent rotation of the clutch gear relative to the output shaft and relative to the other clutch gears and for sliding movement of the clutch gear axially along the output shaft, each clutch gear being disposed in mesh with the drive gear of a different one of the idler gears and rotatively driven thereby, a plurality of dogs extending axially outwardly from one side of each clutch gear in spaced relation from each other about the output shaft, a pin fixed to the output shaft and extending radially therefrom adjacent each clutch gear on the same side thereof as the dogs on that clutch gear and spaced axially on the output shaft from such dogs, said dogs being spaced from each other about the output shaft to receive the pin between the dogs and engage the pin, each pin being aligned with the idler gear in mesh with the clutch gear adjacent that pin so that the clutch gear is in mesh with the idler gear when the pin is disposed between the dogs thereon, a hub on each clutch gear and defining an annular groove in its exterior surface about the axis of rotation of the output shaft, a plurality of levers disposed on the housing each with one of its ends disposed movably in the annular recess in the hub of a different clutch gear so that the clutch gear rotates freely relative to the lever and the lever may be actuated to move the clutch gear axially on the output shaft, means for movably mounting each lever on the housing for actuation of each lever to reciprocate the clutch gear engaged by the lever axially along the output shaft, a plurality of pushrod means disposed on the housing and extending exteriorly thereof, means for movably mounting each pushrod means on the housing, means for operatively connecting each pushrod means to a different lever for moving the lever to displace the clutch gear engaged thereby toward the pin adjacent the dogs on that clutch gear and into engagement of such dogs with such pin responsive to movement of the pushrod means to an actuated position and for moving the lever to displace the clutch gear away from such pin and disengage the dogs on that clutch gear from the pin responsive to movement of the pushrod means to a nonactuated position, spring means for biasing each pushrod means to nonactuated position, holding means for releasably holding each pushrod means in actuated position responsive to movement of the pushrod means to actuated position and for releasing such pushrod means to nonactuated position responsive to movement of another pushrod means to actuated position, and spring means for biasing each lever to position the clutch gear engaged thereby with its dogs axially spaced from the pin adjacent thereto and with the clutch gear in mesh with the idler gear responsive to the pushrod means connected to the lever means being in nonactuated position and for biasing the lever to position the clutch gear connected thereto in mesh with the idler gear and with its dogs in engagement with the pin adjacent thereto responsive to such pushrod means being in actuated position.

8. A transmission comprising a housing, and elongated input shaft disposed in the housing and extending exteriorly from the housing, means for rotatably mounting the input shaft on the housing, a circular main gear on the input shaft within the housing, means for fixing the main gear to the input shaft for rotation of the main gear with the input shaft, an elongated idler shaft disposed in the housing in spaced relation from the input shaft with its axis parallel to the axis of rotation of the input shaft, a plurality of input gears disposed on the input shaft adjacent to each other, means for rotatably mounting each input gear on the input shaft for independent rotation of the input gear relative to the input shaft and relative to the other input gears, a plurality of idler gears disposed on the idler shaft adjacent to each other and aligned with the input gears, means for rotatably mounting each idler gear on the idler shaft for independent rotation of the idler gear relative to the idler shaft and relative to the other idler gears, each input gear and idler gear being identical and being comprised of a circular drive gear and a circular pinion gear having less diameter than the drive gear and fixed to the drive gear concentrically therewith, a first idler gear disposed with its drive gear in mesh with the main gear and with its pinion gear in mesh with the drive gear of a first input gear, the next successive idler gear disposed with its drive gear in mesh with the pinion gear of the first input gear and with its pinion gear in mesh with the drive gear of the next successive input gear, and each successive idler gear being disposed with its drive gear in mesh with the pinion gear of the input gear in mesh with the pinion gear of the preceding idler gear and with its pinion gear in mesh with the drive gear of the next successive input gear, so that all of the input gears and idler gears are rotatively driven simultaneously responsive to rotation of the input shaft and main gear, an elongated output shaft disposed in the housing in spaced relation from the idler shaft, means for rotatably mounting the output shaft on the housing with its axis of rotation parallel to the axis of rotation of the input shaft, a plurality of circular clutch gears on the output shaft in axially spaced relation from each other, means for rotatably mounting each clutch gear on the output shaft for independent rotation of the clutch gear relative to the output shaft and relative to the other clutch gears and for sliding movement of the clutch gear axially along the output shaft, each clutch gear being disposed in mesh with the drive gear of a different one of the idler gears and rotatively driven thereby, a plurality of dogs extending axially outwardly from one side of each clutch gear in spaced relation from each other about the output shaft, a pin fixed to the output shaft and extending radially therefrom adjacent each clutch gear on the same side thereof as the dogs on that clutch gear and spaced axially on the output shaft from such dogs, said dogs being spaced from each other about the output shaft to receive the pin between the dogs and engage the pin, each pin being aligned with the idler gear in mesh with the clutch gear adjacent that pin so that the clutch gear is in mesh with the idler gear when the pin is disposed between the dogs thereon, a hub on each clutch gear and defining an annular groove in its exterior surface about the axis of rotation of the output shaft, a plurality of levers disposed on the housing each with one of its ends disposed movably in the annular recess in the hub of a different clutch gear so that the clutch gear rotates freely relative to the lever and the lever may be actuated to move the clutch gear axially on the output shaft, means for movably mounting each lever on the housing for actuation of each lever to reciprocate the clutch gear engaged by the lever axially along the output shaft, a plurality of pushrod means disposed on the housing and extending exteriorly thereof, means for movably mounting each pushrod means on the housing means for operatively connecting each pushrod means to a different lever for moving the lever to displace the clutch gear engaged thereby toward the pin adjacent the dogs on that clutch gear and into engagement of such dogs with such pin responsive to movement of the pushrod means to an actuated position and for moving the lever to displace the clutch gear away from such pin and disengage the dogs on that clutch gear from the pin responsive to movement of the pushrod means to a nonactuated position, spring means for biasing each pushrod means to nonactuated position, and holding means for releasably holding each pushrod means in actuated position responsive to movement of the pushrod means to actuated position and for releasing such pushrod means to nonactuated position responsive to movement of another pushrod means to actuated position.

References Cited in the file of this patent

UNITED STATES PATENTS

| | | |
|---|---|---|
| 827,742 | Markgraf | Aug. 7, 1906 |
| 2,675,710 | Ruhland | Apr. 20, 1954 |
| 2,988,187 | Doble | June 13, 1961 |

FOREIGN PATENTS

| | | |
|---|---|---|
| 593,585 | Germany | Feb. 27, 1934 |
| 1,181,482 | France | Jan. 12, 1959 |

OTHER REFERENCES

Popular Science, September 1959, pp. 82–83, 250.
Product Engineering, December 1960, pp. 48–49.

UNITED STATES PATENT OFFICE
CERTIFICATE OF CORRECTION

Patent No. 3,084,563            April 9, 1963

Albert W. Fischer

It is hereby certified that error appears in the above numbered patent requiring correction and that the said Letters Patent should read as corrected below.

Column 6, line 69, for "120" read -- 130 --; column 9, line 4, for "71" read -- 171 --; column 12, line 38, after "means", first occurrence, insert -- is --.

Signed and sealed this 5th day of November 1963.

(SEAL)
Attest:
ERNEST W. SWIDER

EDWIN L. REYNOLDS

Attesting Officer

Acting Commissioner of Patents